(12) United States Patent
Grover

(10) Patent No.: US 9,026,912 B2
(45) Date of Patent: May 5, 2015

(54) APPARATUS AND METHOD FOR CONTROLLING A MULTI-MEDIA PRESENTATION

(75) Inventor: Douglas M. Grover, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 620 days.

(21) Appl. No.: 12/898,400

(22) Filed: Oct. 5, 2010

(65) Prior Publication Data

US 2011/0246884 A1     Oct. 6, 2011

Related U.S. Application Data

(60) Provisional application No. 61/318,902, filed on Mar. 30, 2010.

(51) Int. Cl.
    *G06F 17/30*         (2006.01)
(52) U.S. Cl.
    CPC ................................ *G06F 17/30056* (2013.01)
(58) Field of Classification Search
    CPC .................... G06F 17/30056; H04L 29/06414
    USPC ........................................................ 715/202
    See application file for complete search history.

(56) References Cited

U.S. PATENT DOCUMENTS

| 5,777,616 | A  * | 7/1998  | Bates et al. ................... 715/837 |
| 6,952,799 | B2 * | 10/2005 | Edwards et al. ............... 715/207 |
| 7,434,165 | B2 * | 10/2008 | Kleinman et al. ............. 715/732 |
| 8,032,832 | B2 * | 10/2011 | Russ et al. ..................... 715/731 |
| 2005/0086200 | A1 * | 4/2005  | Kirkman et al. .................. 707/2 |
| 2006/0048076 | A1   | 3/2006  | Vronay et al. |
| 2006/0288293 | A1 * | 12/2006 | Karasawa et al. ............. 715/730 |
| 2007/0162953 | A1   | 7/2007  | Bolliger et al. |
| 2008/0204423 | A1 * | 8/2008  | Kim .............................. 345/173 |
| 2008/0238922 | A1   | 10/2008 | Rhodes et al. |
| 2009/0106674 | A1 * | 4/2009  | Bray et al. ..................... 715/762 |
| 2010/0031152 | A1 * | 2/2010  | Villaron et al. ............... 715/731 |
| 2010/0218099 | A1 * | 8/2010  | van Melle et al. ............ 715/730 |

FOREIGN PATENT DOCUMENTS

| WO | 01/54411  | 7/2001  |
| WO | 02/097779 | 12/2002 |

\* cited by examiner

*Primary Examiner* — Alvin Tan

(57) ABSTRACT

A method for controlling a multi-media presentation is provided. The method includes displaying an event structure related to an event on a graphical user interface, getting a plurality of event items associated with the event, and displaying the plurality of event items associated with the event structure on the graphical user interface. Responsive to an event trigger, the event is started. The method further includes receiving a selection of a first event item from the plurality of event items, performing a first action related to the first event item, and sending an output of the first action to a display device.

21 Claims, 9 Drawing Sheets

APPARATUS AND METHOD FOR CONTROLLING A MULTI-MEDIA PRESENTATION

RELATED APPLICATIONS

This application hereby claims the benefit of and priority to U.S. Provisional Patent Application No. 61/318,902, titled "MULTI-MEDIA MANAGEMENT SYSTEM", filed on Mar. 30, 2010, and which is hereby incorporated by reference in its entirety.

TECHNICAL BACKGROUND

When a multi-media presentation is being given in a conference using software such as WebEx™ or other systems that allow the user to display their desktop, the presenter can use a variety of applications, documents, sound/video, and the like. Each of these applications is independent and is shown that way during the conference.

Typically the documents presented during the web conference are not associated, so the presenter may start one application, and then may search for a second document or application that needs to be displayed or played as part of the web conference. This may waste time as the presenter searches for the different files or applications to present. Moreover, the presenter must keep track of which documents and applications are being displayed, which documents and applications have been minimized, and which documents and applications may not be a part of the presentation.

OVERVIEW

In an embodiment, a method for controlling a multi-media presentation is provided. The method includes displaying an event structure related to an event on a graphical user interface, getting a plurality of event items associated with the event, and displaying the plurality of event items associated with the event structure on the graphical user interface. Responsive to an event trigger, the event is started. The method further includes receiving a selection of a first event item from the plurality of event items, performing a first action related to the first event item, and sending an output of the first action to a display device.

In another embodiment, a multi-media presentation controller is provided. The multi-media presentation controller includes a display comprising a graphical user interface, an output configured to transfer data to a display device, and a processor coupled to the display and the output. The processor is configured to display an event structure related to an event on a graphical user interface, get a plurality of event items associated with the event, and to display the plurality of event items associated with the event structure on the graphical user interface.

Responsive to an event trigger, the processor starts the event. The processor is also configured to receive a selection of a first event item from the plurality of event items, perform a first action related to the first event item, and send an output of the first action to a display device.

In a further embodiment, a multi-media presentation controller is provided. The multi-media presentation controller includes a display comprising a graphical user interface, an output configured to transfer data and commands to a presentation controller, and a processor coupled to the display and the output. The processor is configured to display an event structure related to an event on a graphical user interface, get a plurality of event items associated with the event, and to display the plurality of event items associated with the event structure on the graphical user interface.

Responsive to an event trigger, the processor is configured to send a command through the output to the presentation controller causing the presentation controller to start the event. The processor is also configured to receive a selection of a first event item from the plurality of event items, and to send another command through the output to the presentation controller. The another command causes the presentation controller to perform a first action related to the first event item, and to send an output of the first action to a main window on a display device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
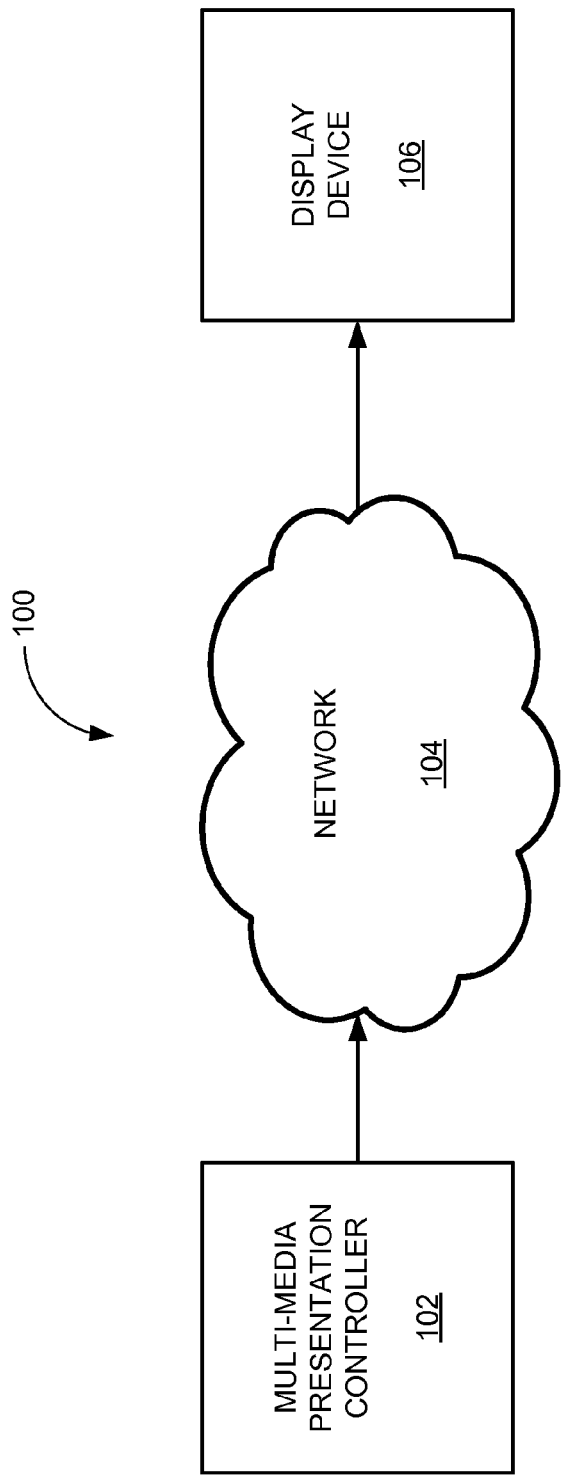
FIG. 1 illustrates an embodiment of a multi-media system.

FIG. 1 illustrates an embodiment of a multi-media system 100. In this example embodiment, multi-media presentation controller communicates with display device 106 through network 104. Display device 106 may be configured to display both graphical and audio outputs to an audience. Graphical outputs may be as simple as a text file or as complex as a video display, or the like.

Figure 5:
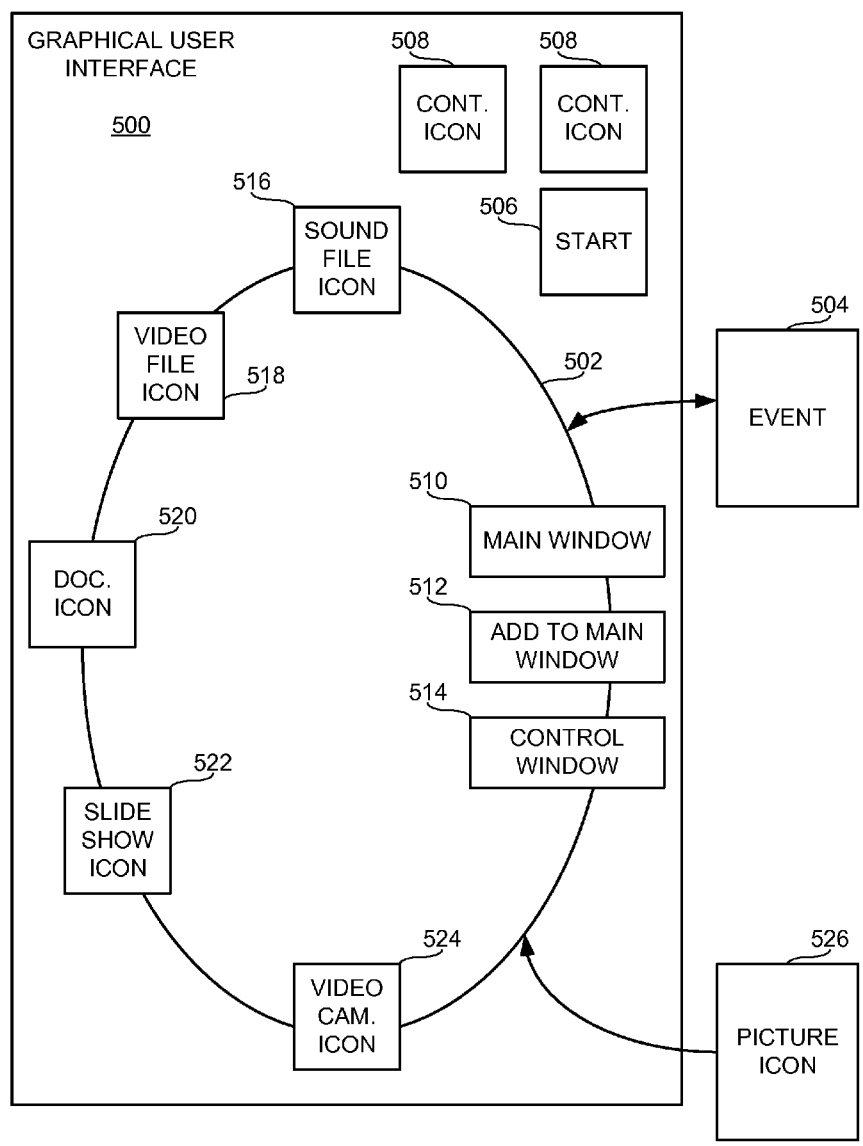
FIG. 5 illustrates a graphical user interface of a multi-media presentation controller.
Figure 6:
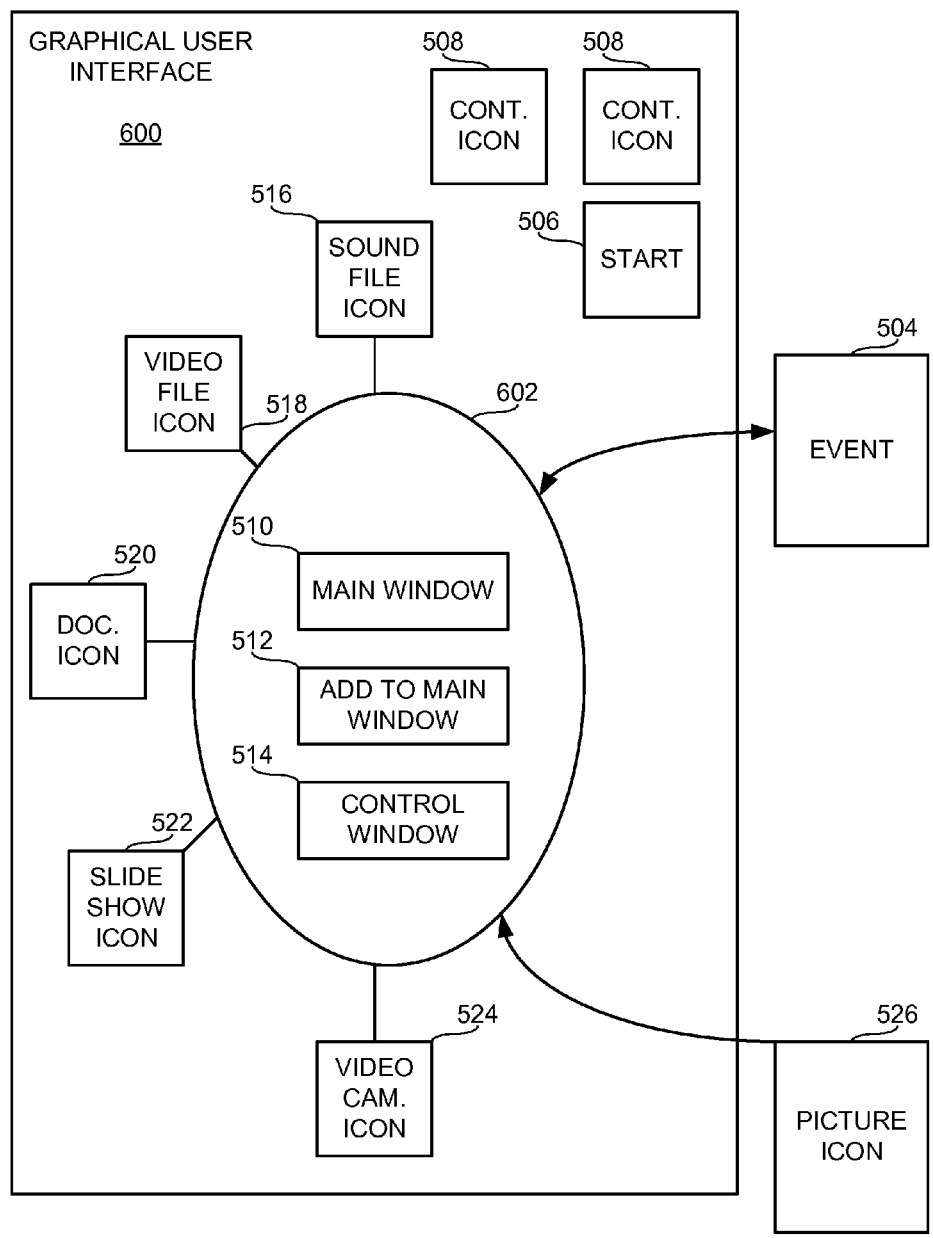
FIG. 6 illustrates a graphical user interface of a multi-media presentation controller.
Figure 7:
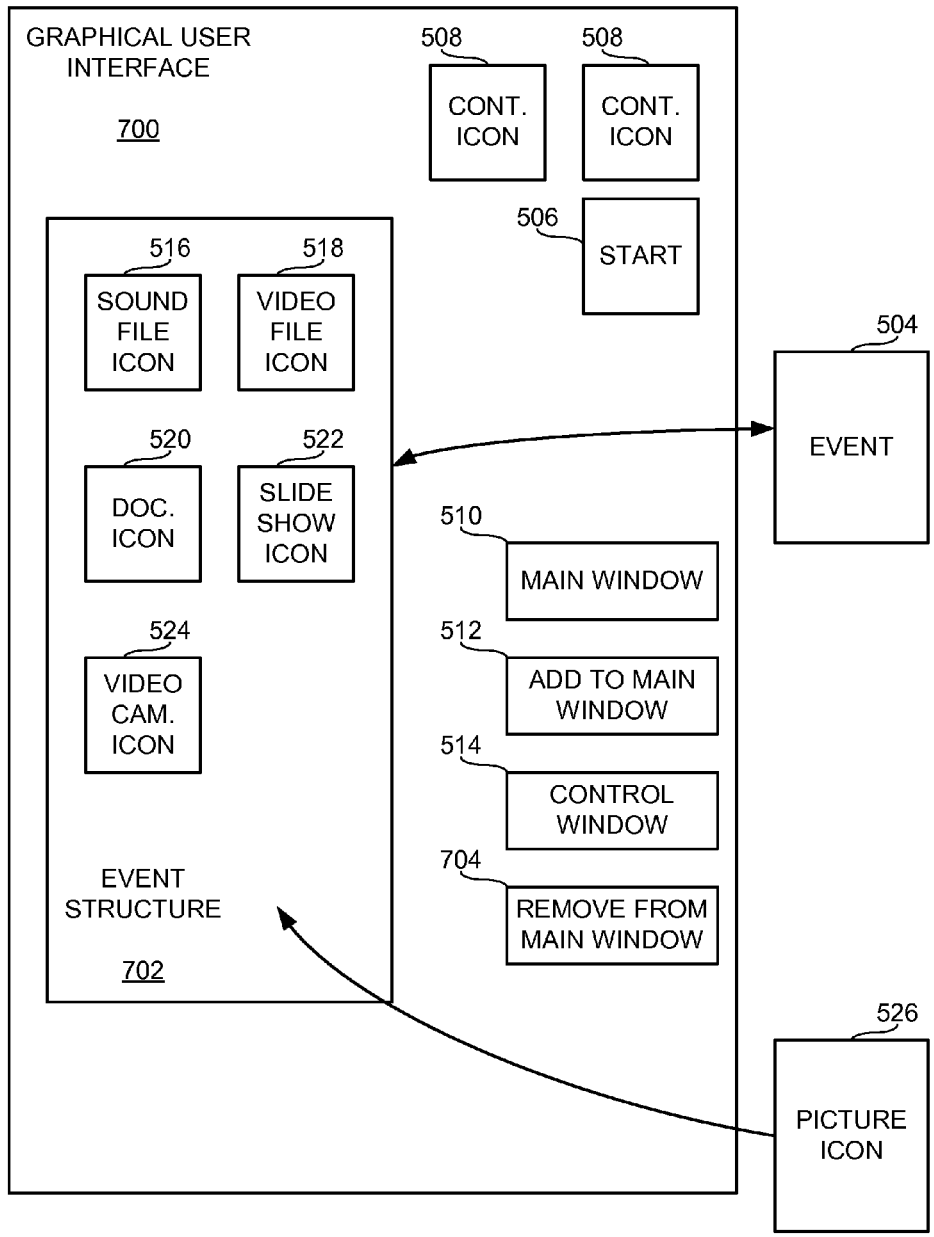
FIG. 7 illustrates a graphical user interface of a multi-media presentation controller.

Multi-media presentation controller 102 includes a display capable of displaying a graphical user interface (GUI) such as those shown in FIGS. 5-7. A user interacts with the GUI directing multi-media presentation controller 102 to execute applications and transmit the results of these applications to display device 106 through network 104. The results transmitted to display device 106 may include both graphical and audio outputs from the applications.

Multi-media presentation controller 102 is configured to display an event structure related to an event on the GUI. An event may be a presentation, meeting, conference, or other such event requiring a display of a plurality of files, documents, applications, programs, or the like. These applications may be executed on multi-media presentation controller 102 and their outputs may be transmitted to display device 106 through network 104 for display to an audience which may be local or remote to the operator of multi-media presentation controller 102.

An event structure is any graphical object configured to be graphically associated with one or more event items. The event structure may take the shape of a square, rectangle, circle, oval, or the like as illustrated by way of non-limiting examples in FIGS. 5-7. An event item is any file, document, video file, audio file, media file, and the like associated with an application used to display the file, document, video file, audio file, or media file and is represented by a graphical icon or the like. Event items may then be moved about the GUI and associated with the event structure.

Also present on the GUI are a plurality of control icons. These control icons may include icons for triggering an event, adding an event item to the current display, removing an event item from the current display, changing active windows within the active display, or the like. For example, when a user activates an event trigger icon, multi-media presentation controller 102 starts the event.

Starting the event may include performing an action such as running an application with a given input, such as a media file. For example, a default event item may be associated with the event structure representing a default application with a default input to be run when any event is started. Multi-media presentation controller 102 executes the default application with the default input and transmits the output of the default application to display device 106 through network 104.

Event items may be created by a user selecting an application and an input for the application. (Note that some applications may not require inputs.) Responsive to the selection by the user, multi-media presentation controller 102 creates an event item (represented graphically by an icon) and places the event item on the GUI for access by the user. The user may then associate the event item with the event structure. Alternatively, newly created event items may be automatically associated with an active event structure upon creation.

In some embodiments, input files may have a file type which is automatically associated with a default application. In such a case, the user needs merely to select the input file for an event item and multi-media presentation controller 102 automatically associates the input file with the appropriate application and creates the appropriate event item.

Optionally, a user may organize event items within or on the event structure in an order to be used in the presentation. This allows a user to graphically see which event items are required in which order. Multi-media presentation controller 102 may then automatically process for display the event items in the order shown by the event structure.

In some embodiments, a user may graphically associate (for example by dragging and dropping) an icon representing a media file with the event structure. In response to this operation, multi-media presentation controller 102 determines the appropriate application for the media file, associates the application with the media file, creates an event item representing the application and the media file, and associates the event item with the event structure.

In optional embodiments, display device 106 may include multiple windows for display to the audience. For example, a main window may be used to display the output of the presently running application to the audience, while a smaller control window may be used to display inputs to the presently running application to the audience. In such an embodiment, multi-media presentation controller 102 would include control icons for both display windows on the GUI and allow a user to control which event items are associated with which window through use of the event structure.

In some embodiments, multiple event items may be executed at the same time by use of a control icon that adds event items to the current display. In other embodiments, a control icon that removes event items from the current display may be used to stop execution of a currently running application associated with an event item.

Figure 2:
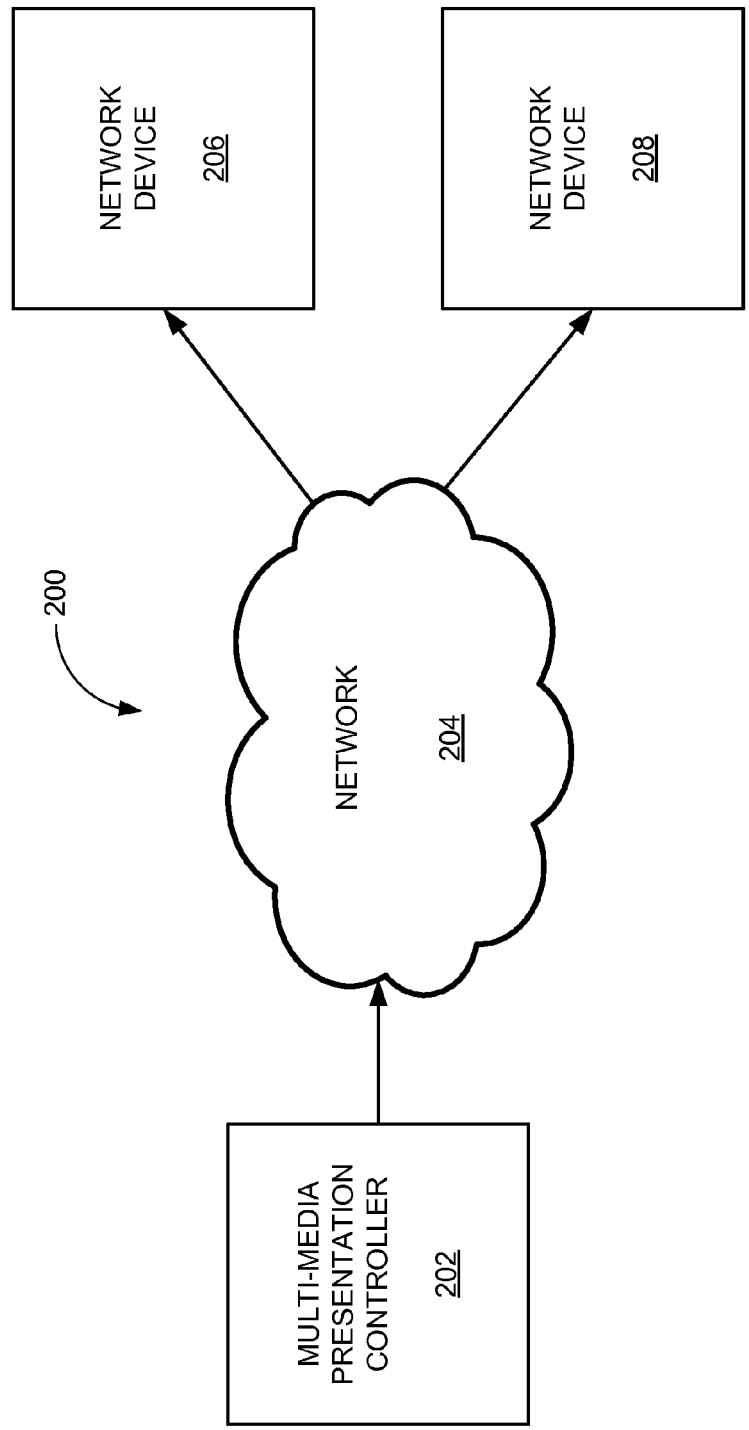
FIG. 2 illustrates an embodiment of a multi-media system.

FIG. 2 illustrates an embodiment of a multi-media system 200. In this example embodiment, multi-media presentation controller 202 is configured to transmit graphical displays to network devices 206 and 208 through network 204. This example may be used when a plurality of network devices are used to display the presentation such as a webcast where each participant has a network device, such as network devices 206 and 208, used to display a presentation from multi-media presentation controller 202.

Multi-media presentation controller 202 operates similarly to multi-media presentation controller 102 as described above, however its outputs are transmitted to a plurality of network devices instead of to display device 106.

Figure 3:
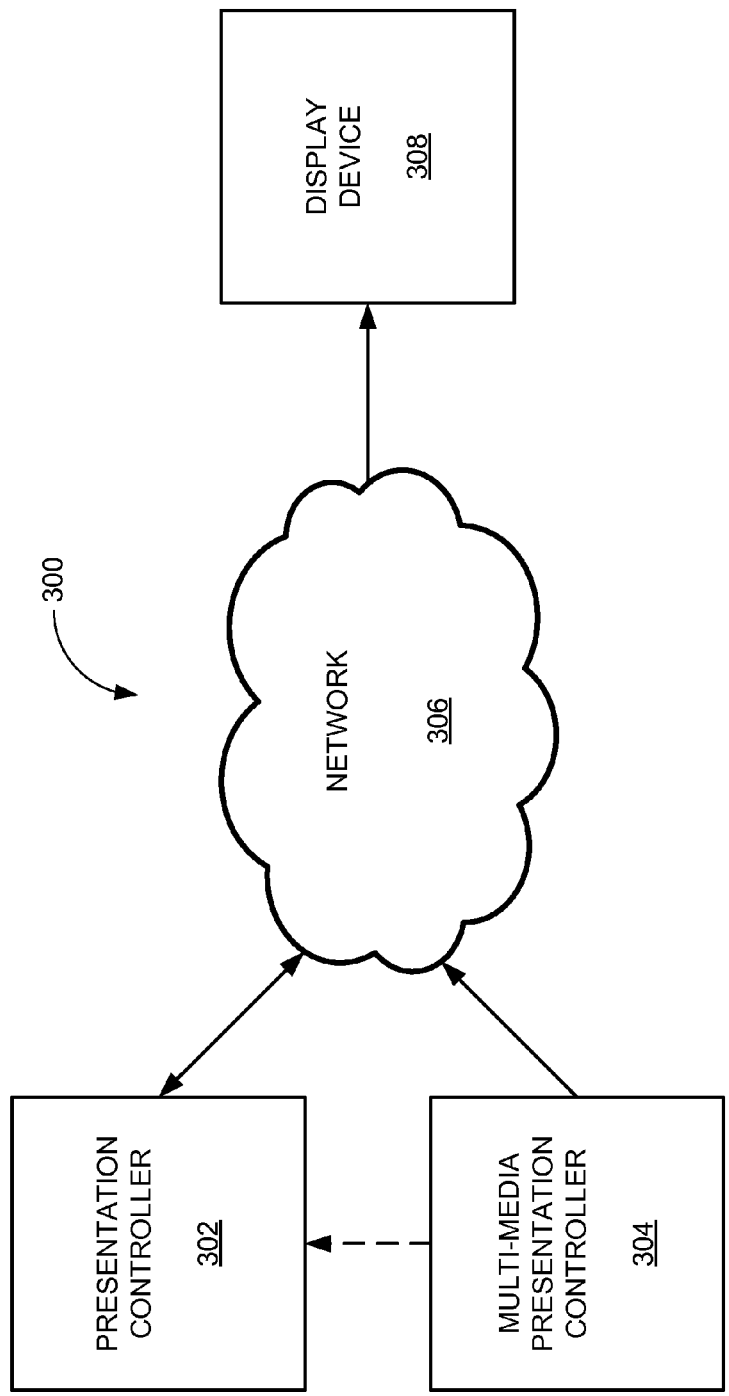
FIG. 3 illustrates an embodiment of a multi-media system.

FIG. 3 illustrates an embodiment of a multi-media system 300. In this example embodiment, multi-media presentation controller 304 is used to control presentation controller 302 which executes selected applications and transmits the graphical or audio outputs of the applications to display device 308 through network 306.

Multi-media presentation controller 304 operates similarly to multi-media presentation controller 102 as described above, however it does not actually execute the applications. Instead it transmits commands to presentation controller 302 either directly or through network 306 causing presentation controller 302 to execute the selected application with the selected input and transmit the graphical or audio output of the application to display device 308 through network 304.

In this example, multi-media presentation controller 304 may be a small hand-held device including a touch screen allowing a user to be mobile while controlling the presentation through presentation controller 302. Multi-media presentation controller 304 may communicate directly with presentation controller 302 through infrared (IR) signals, radio frequency (RF) signals, or the like represented by the dashed arrow in FIG. 3.

Figure 4:
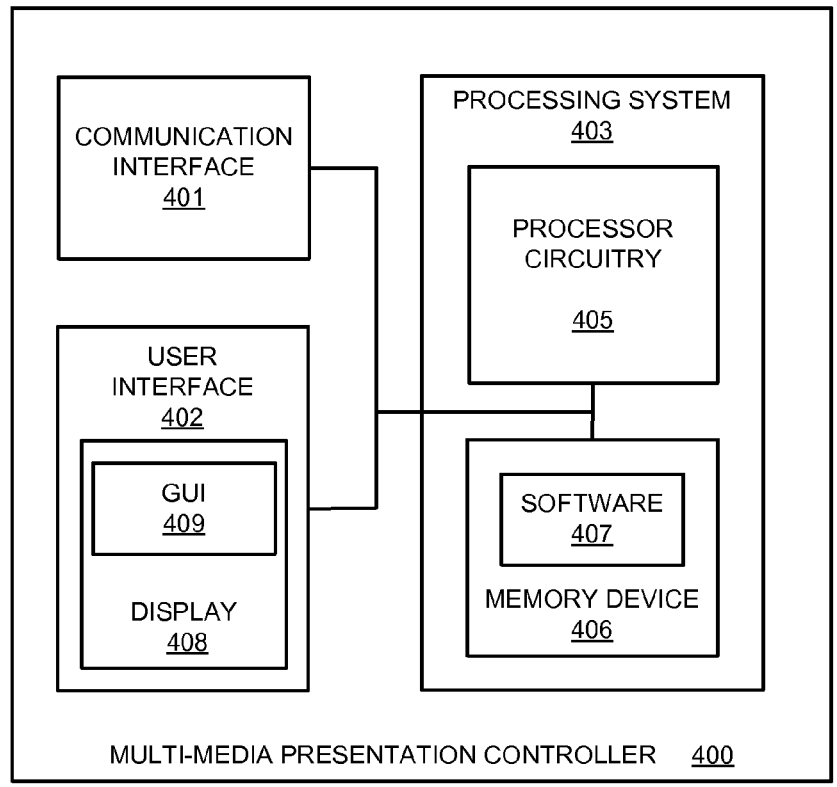
FIG. 4 illustrates a multi-media presentation controller.

FIG. 4 illustrates a multi-media presentation controller. The multi-media presentation controller 400 may be implemented as shown in FIG. 2. Multi-media presentation controller 400 includes communication interface 401, user interface 402, and processing system 403. Processing system 403 is linked to communication interface 401 and user interface 402 through a bus. Processing system 403 includes processing circuitry 405 and memory device 406 that stores operating software 407.

Communication interface 401 includes components that communicate over communication links, such as network cards, ports, RF transceivers, processing circuitry and software, or some other communication devices. Communication interface 401 may be configured to communicate over metallic, wireless, or optical links. Communication interface 401 may be configured to use TDM, IP, Ethernet, optical networking, wireless protocols, communication signaling, or some other communication format—including combinations thereof.

In some embodiments, communication interface 401 is configured to output graphical displays from an application running on processing system 403 to a display device through a network for display to an audience. In other embodiments, communication interface 401 is configured to output commands to a presentation controller, such as that illustrated in FIG. 3, causing the presentation controller to run selected applications and output graphical and audio displays from the applications to a display device through a network for display to an audience.

User interface 402 includes components that interact with a user. User interface 402 may include a keyboard, display 408, mouse, touch pad, or some other user input/output apparatus. Display 408 includes a graphical user interface (GUI) 409 as illustrated in FIGS. 5-7. In some embodiments, such as the one illustrated in FIG. 3, multi-media presentation controller 400 may be a small hand-held device and display 408 may be a touch screen.

Processing circuitry 405 includes microprocessor and other circuitry that retrieves and executes software 407 from memory device 406. Memory device 406 includes a disk drive, flash drive, data storage circuitry, or some other memory apparatus. Software 407 includes computer programs, firmware, or some other form of machine-readable processing instructions. Software 407 may include an operating system, utilities, drivers, network interfaces, applications, or some other type of software. When executed by circuitry 405, software 407 directs processing system 403 to operate multi-media presentation controller 400 as described herein.

FIG. 5 illustrates a graphical user interface of a multi-media presentation controller. This example multi-media presentation controller includes a display showing graphical user interface (GUI) 500. GUI 500 includes event structure 502, command icons 510, 512, and 514, control icons 506 and 508, and event icons 516, 518, 520, 522, and 524.

When start control icon 506 is activated by a user, the multi-media presentation controller starts event 504. Starting event 504 may include running a default application with a default input and transmitting the graphical output of the application to a display device. Control icons 508 may be used for controlling an output of the application. For example, they may be configured as play, pause, fast-forward, or rewind icons for use while a video presentation is being output to a display device.

In this example, three command icons 510, 512, and 514 are illustrated by way of a non-limiting example. However, other examples may use any number and configuration of command icons and control icons. In this embodiment, when an event item is associated with main window command icon 510 (such as by rotating event structure 502), the application associated with the selected event item is run with the input associated with the selected event item and the graphical or audio output of the application is transmitted to a display device.

When an event item is associated with add to main window icon 512 (for example, being placed on top of the icon by rotating event structure 502), the application associated with the selected event item is run with the input associated with the selected event item and the graphical or audio output of the application is transmitted to the display device for display along with the output of any other applications currently running in the main window.

In this example embodiment, event structure 502 is an oval with which a plurality of event items may be associated. Event structure 502 may be rotated by a user to bring any selected event item in association with any desired command window.

In this example, event structure 502 has five event items associated with it. By way of non-limiting example, event item 516 is a sound file icon, event item 518 is a video file icon, event item 520 is a document icon, event item 522 is a slide show icon, and event item 524 is a video camera icon. When a user wishes to add an event icon for a picture, picture icon 526 may be dragged and dropped onto event structure 502 and the multi-media presentation controller creates an event item for the picture and associates the new event item with event structure 502.

Consider the following illustrative example of how this works. A user using a touch screen can place their finger on slide show icon 522 and rotate event structure 502 so that slide show icon 522 is on window command icon 510; by taping on the screen, the slide show is displayed the main window (or it may be delayed until the user selects start control icon 506). If the user now wants to add sound to the slide show, the user can select sound file icon 516 and rotate event structure 502 in a similar manner so that the sound file icon is now over add to main window icon 512; by tapping the screen, sound from the sound file is played.

To further this example, assume that the user now wants to display a document in front of the slide presentation that is being displayed in the main window. The user can select document icon 520 and rotate event structure 502 so that document icon 520 is now over control window icon 514; by tapping the screen, a control window appears in front of the slide show that contains the document represented by document icon 520. Now assume that the user wants to a show video file in the main window instead of the slide show. The user selects video file icon 518 and rotates event structure 502 so that video file icon 518 is over window command icon 510; by tapping the screen, the video file represented by video file icon 518 is now played in the main window. FIG. 5 is shown with three command icons (510, 512, and 514). However other command icons can be used such as a remove control window icon, a remove from main window icon, and the like. Being able to easily add and remove media from the presentation allows the user to give a presentation in a more uniform and seamless fashion.

FIG. 6 illustrates a graphical user interface of a multi-media presentation controller. This example embodiment is very similar to that illustrated in FIG. 5, however GUI 600 now includes event structure 602 which is in a hub and spokes configuration. In this illustrative example, instead of rotating event structure 602, users can just drag and drop an event icon onto a command icon to perform a given function.

FIG. 7 illustrates a graphical user interface of a multi-media presentation controller. This example embodiment is also very similar to that illustrated in FIG. 6, however GUI 700 now includes event structure 702 which is in a box or window configuration. Operation of this GUI 700 is similar to that described above with respect to FIG. 6.

This example embodiment also includes remove from main window icon 704 which may be used to selectively remove applications from display on the main window. For example, when a video application and an audio application are both running and their outputs are being sent to the display device, the user may drag and drop sound file icon 516 onto remove from main window icon 704 and the audio application will be terminated while the video application continues to display in the main window.

Figure 8:
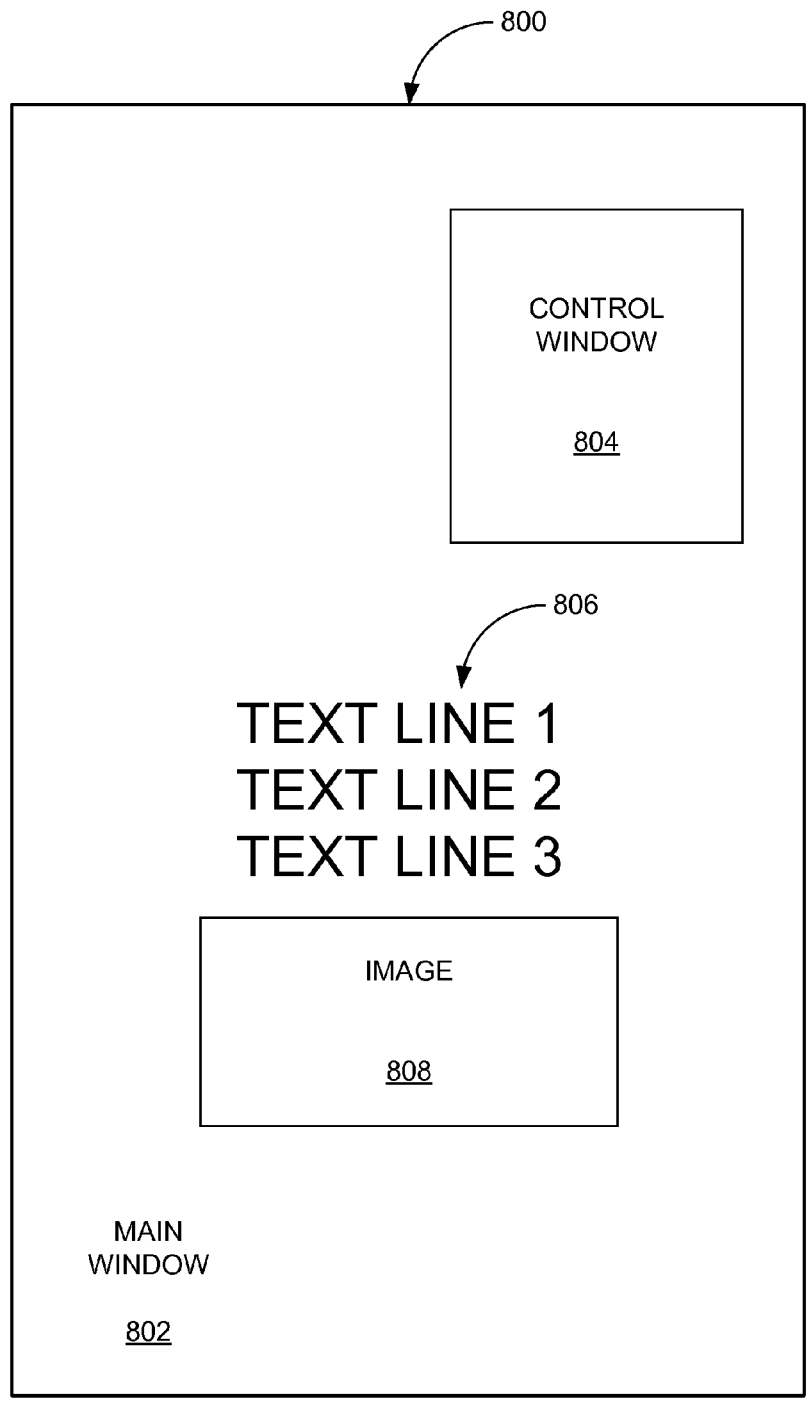
FIG. 8 illustrates a display device.

FIG. 8 illustrates a display device 800. In this example embodiment display device 800 includes main window 802 and control window 804. Main window 802 includes text 806 and image 808. Display device 800 may be any computer display, a projector, or the like capable of displaying graphical information to one or more users. Display device 800 is controlled by a multi-media presentation controller as described herein.

Figure 9:
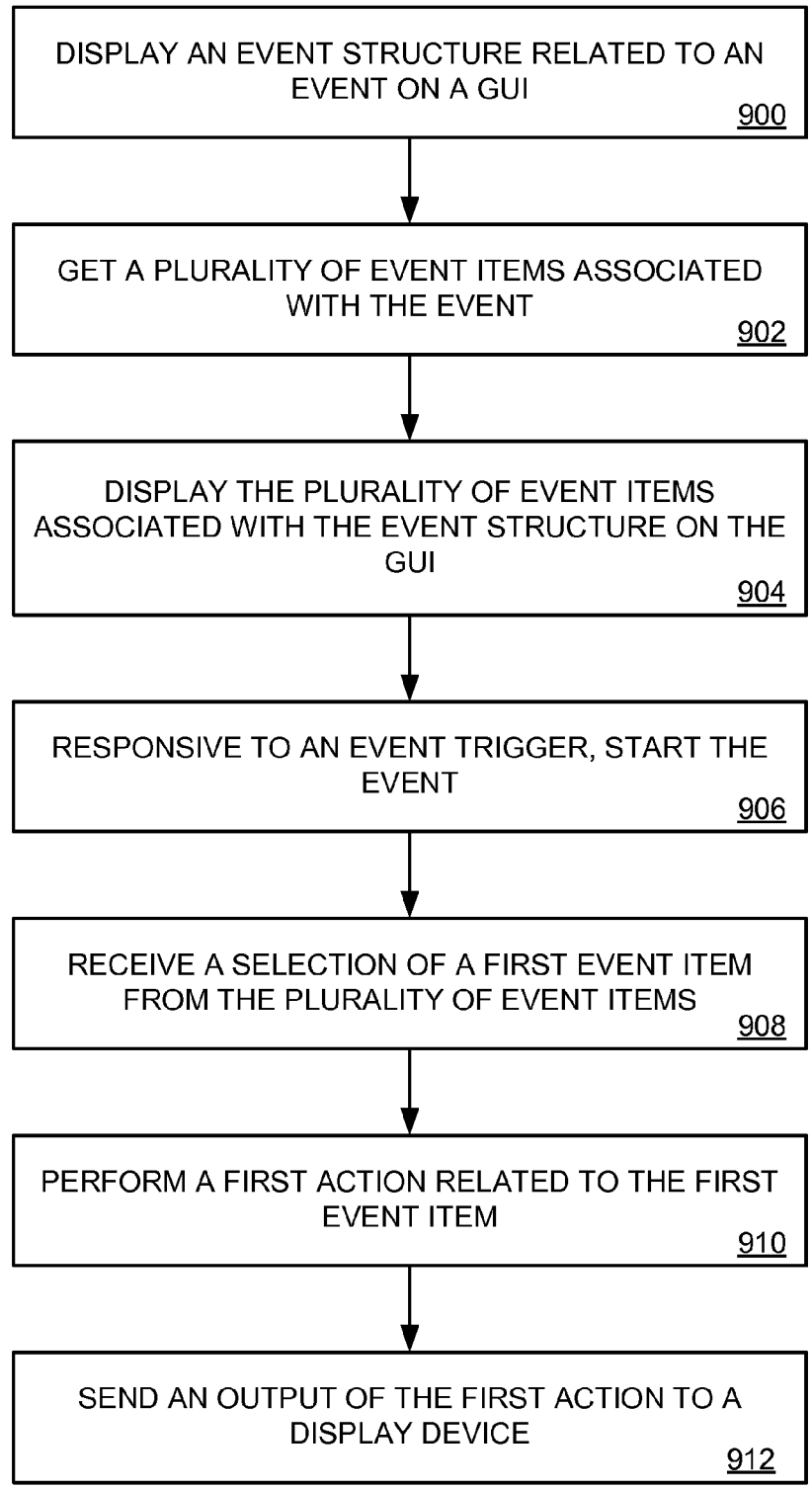
FIG. 9 illustrates a method for operating a multi-media presentation controller.

FIG. 9 illustrates a method for operating a multi-media presentation controller. In this example embodiment, a multi-media presentation controller displays an event structure related to an event on a GUI, (operation 900). The controller then gets a plurality of event items associated with the event, (operation 902), and displays the plurality of event items associated with the event structure on the GUI, (operation 904).

Responsive to an event trigger, the controller starts the event, (operation 906). The controller then receives a selection of a first event item from the plurality of event items, (operation 908), and then performs a first action related to the first event item, (operation 910). Finally, the controller sends an output of the first action to a display device, (operation 912). Within this method the multi-media presentation controller operates substantially as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for controlling a multi-media presentation, comprising:
   displaying an event structure related to an event on a graphical user interface;
   responsive to a user dragging and dropping an icon representing a media file onto the event structure, creating a first event item representing the media file;
   getting a plurality of event items associated with the event including the first event item and a second event item, each event item of the plurality of event items comprising a file associated with an application used to display the file to an audience and represented by graphical icons;
   displaying the plurality of event items associated with the event structure on the graphical user interface;
   responsive to an event trigger, starting the event and automatically processing for display the plurality of event items in an order shown by the event structure;
   receiving a selection of the first event item from the plurality of event items;
   performing a first action related to the first event item;
   sending an output of the first action to a main window of a display device, which displays the multi-media presentation to the audience;
   displaying an add to main window icon on the graphical user interface; and
   responsive to the user dragging and dropping the second event item onto the add to main window icon, performing a second action based on the second event item, and sending an output of the second action to the main window on the display device for display while the output of the first action is currently running in the main window.

2. The method of claim 1 responsive to a user selecting a second media file and an application used to display the second media file to an audience, associating the second media file with the application, and creating a third event item representing the second media file and the application;
   performing a third action related to the third event item comprising:
      running the application associated with the second media file using the second media file as an input to the application; and
   sending an output of the third action comprising:
      sending an output of the application associated with the second media file.

3. The method of claim 1 further comprising:
   responsive to a user selecting a second media file, creating a third event item representing the second media file;
   sending an output of a third action comprising:
      sending at least some contents of the second media file.

4. The method of claim 1 further comprising:
   responsive to the user selecting a second media file having a file type, determining a default application used to display the second media file to an audience based on the file type, associating the second media file with the default application, and creating a third event item representing the second media file and the default application;
   performing a third action related to the third event item comprising:
      running the default application using the second media file as an input to the default application; and
   sending an output of the third action comprising:
      sending an output of the default application.

5. The method of claim 1 wherein sending the output of the first action comprises:
   sending at least some contents of the media file.

6. The method of claim 1 further comprising:
   responsive to a user dragging and dropping an icon representing a second media file having a file type onto the event structure, determining a default application used to display the second media file to an audience based on the file type, and creating a third event item representing the second media file and the default application;
   performing a third action related to the third event item comprising:
      running the default application using the second media file as an input to the default application; and
   sending an output of the third action comprising:
      sending an output of the default application.

7. The method of claim 1 further comprising:
   displaying a remove from main window icon on the graphical user interface; and
   responsive to a user dragging and dropping the second event item onto the remove from main window icon, stopping the second action based on the second event item, and discontinuing sending the output of the second action while continuing to send the output of the first action to the main window on the display device.

8. The method of claim 1 further comprising:
   displaying a control window icon on the graphical user interface; and
   responsive to a user dragging and dropping the second event item onto the control window icon, performing the second action based on the second event item, opening a control window on the display device, and sending an output of the second action to the control window on the display device.

9. The method of claim 1 further comprising:

designating the second event item as a default event item; and responsive to starting the event, performing the second action based on the default event item, and sending an output of the second action to the display device.

10. The method of claim 1, wherein:

the event structure is configured to allow rotation;

the event items associated with the event structure are configured to move with the rotation of the event structure; and wherein receiving the selection of the first event item from the plurality of event items comprises determining that the event structure has been rotated into a position where the first event item contacts a command icon.

11. A multi-media presentation controller comprising:

a display comprising a graphical user interface;

an output configured to transfer data to a display device; and a processor coupled to the display and the output, configured to:

display an event structure related to an event on the graphical user interface;

responsive to a user dragging and dropping an icon representing a media file onto the event structure, creating a first event item representing the media file;

get a plurality of event items associated with the event, including the first event item and a second event item, each event item of the plurality of event items comprising a file associated with an application used to display the file to an audience and represented by graphical icons;

display the plurality of event items associated with the event structure on the graphical user interface;

responsive to an event trigger, start the event and automatically process for display the plurality of events items in an order shown by the event structure;

receive a selection of the first event item from the plurality of event items;

perform a first action related to the first event item;

send an output of the first action to a main window of a display device, which displays the multi-media presentation to the audience;

display an add to main window icon on the graphical user interface; and responsive to a user dragging and dropping the second event item onto the add to main window icon, perform a second action based on the second event item, and send an output of the second action to the main window on the display device through the output for display while the output of the first action is currently running in the main window.

12. The multi-media presentation controller of claim 11 wherein the processor is further configured to:

responsive to a user selecting a second media file and an application used to display the second media file to an audience, associate the second media file with the application, and create a third event item representing the second media file and the application;

perform a third action related to the third event item comprising:

run the application associated with the second media file using the second media file as an input to the application; and send an output of the third action comprising:

send an output of the application associated with the second media file.

13. The multi-media presentation controller of claim 11 wherein the processor is further configured to:

responsive to a user selecting a second media file, create a third event item representing the second media file;

send an output of a third action comprising:

send at least some contents of the second media file.

14. The multi-media presentation controller of claim 11 wherein the processor is further configured to:

responsive to the user selecting a second media file having a file type, determine a default application used to display the second media file to an audience based on the file type, associate the second media file with the default application, and create a third event item representing the second media file and the default application;

perform a third action related to the third event item comprising:

run the default application using the second media file as an input to the default application; and send an output of the third action comprising:

send an output of the default application.

15. The multi-media presentation controller of claim 11 wherein send the output of the first action comprises:

send at least some contents of the media file.

16. The multi-media presentation controller of claim 11 wherein the processor is further configured to:

responsive to a user dragging and dropping an icon representing a second media file having a file type onto the event structure, determine a default application used to display the second media file to an audience based on the file type, and create a third event item representing the second media file and the default application;

perform a third action related to the third event item comprising:

run the default application using the second media file as an input to the default application; and send an output of the third action comprising:

send an output of the default application.

17. The multi-media presentation controller of claim 11 wherein the processor is further configured to:

display a remove from main window icon on the graphical user interface; and responsive to a user dragging and dropping the second event item onto the remove from main window icon, stop the second action based on the second event item, and discontinue sending the output of the second action while continuing to send the output of the first action to the main window on the display device.

18. The multi-media presentation controller of claim 11 wherein the processor is further configured to:

display a control window icon on the graphical user interface; and responsive to a user dragging and dropping the second event item onto the control window icon, perform the second action based on the second event item, open a control window on the display device, and send an output of the second action to the control window on the display device through the output.

19. The multi-media presentation controller of claim 11 wherein the processor is further configured to:

designate the second event item as a default event item; and responsive to start the event, perform the second action based on the default event item, and send an output of the second action to the display device through the output.

20. A multi-media presentation controller comprising:

a display comprising a graphical user interface;

an output configured to transfer data and commands to a presentation controller; and a processor coupled to the display and the output, configured to:
- display an event structure related to an event on the graphical user interface;
- responsive to a user dragging and dropping an icon representing a media file onto the event structure, creating a first event item representing the media file;
- get a plurality of event items associated with the event, including the first event item and a second event item, each event item of the plurality of event items comprising a file associated with an application used to display the file to an audience and represented by graphical icons;
- display the plurality of event items associated with the event structure on the graphical user interface;
- responsive to an event trigger, send a command through the output to the presentation controller causing the presentation controller to start the event and automatically process for display the plurality of event items in an order shown by the event structure;
- receive a selection of the first event item from the plurality of event items;
- send another command through the output to the presentation controller causing the presentation controller to perform a first action related to the first event item, and send an output of the first action to a main window on a display device, which displays the multi-media presentation to the audience;
- display an add to main window icon on the graphical user interface; and
- responsive to a user dragging and dropping the second event item onto the add to main window icon, send a further command through the output to the presentation controller causing the presentation controller to perform a second action based on the second event item, and send an output of the second action to the main window on the display device through the output for display while the output of the first action is currently running in the main window.

21. The multi-media display controller of claim 20, wherein the processor is further configured to:
- responsive to the user selecting a second media file and the application used to display the second media file to an audience, associate the second media file with the application, and create a third event item representing the second media file and the application;
- perform a third action related to the third event item comprising:
  - run the application associated with the second media file using the second media file as an input to the application; and
- send an output of the third action comprising:
  - send an output of the application associated with the second media file.

* * * * *